A. STEERS.
Making Extracts.
No. 2,142. Reissued Jan'y 2, 1866.
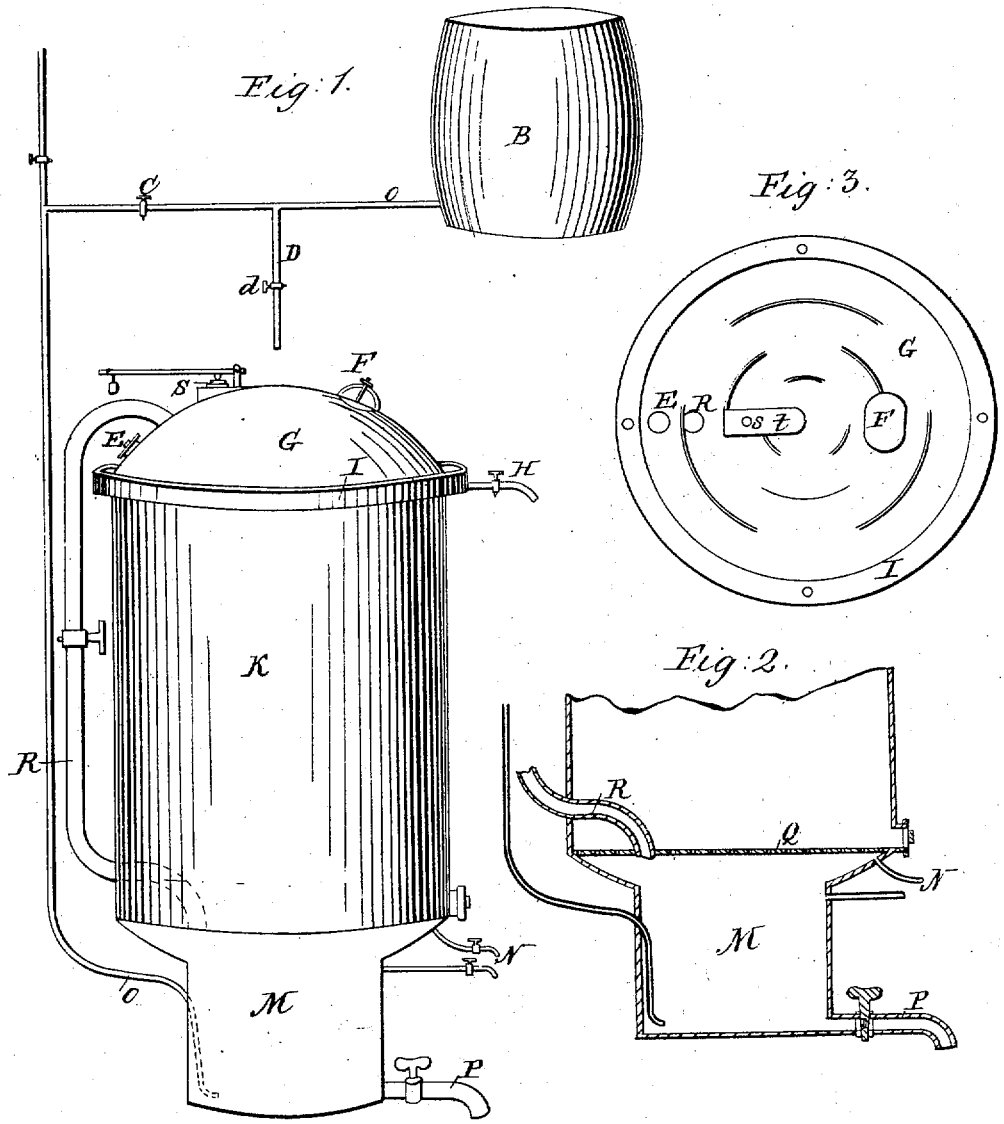

UNITED STATES PATENT OFFICE.

ABRAHAM STEERS, OF MEDINA, NEW YORK.

IMPROVEMENT IN MAKING EXTRACTS.

Specification forming part of Letters Patent No. 14,418, dated March 11, 1856; Reissue No. 2,142, dated January 2, 1866.

*To all whom it may concern:*

Be it known that I, ABRAHAM STEERS, of Medina, in the county of Orleans and State of New York, have invented a new and useful Improvement in Making Extracts; and I do hereby declare that the following is a full, clear, and exact description thereof, which will enable those skilled in the art to make and use the same, reference being had to the accompanying drawings, forming part of this specification, in which—

Figure 1 represents a side elevation of the apparatus which I use in carrying out my invention. Fig. 2 is a partial vertical section of the same. Fig. 3 is a horizontal section of the same.

Similar letters of reference indicate corresponding parts.

This invention relates to a new process for extracting tan-bark and other vegetable substances; and it consists, principally, in the application of steam to damp bark or other substance, so that by the action of the moisture the bark or other substance is swelled, and its pores are opened, and if the steam is admitted it is enabled to penetrate said bark or other substance, and to effect a perfect separation of the soluble and insoluble parts thereof.

The apparatus used in carrying out this invention is composed of a percolator, whose perforated bottom divides it from an evaporating-receiver, and whose dome-shaped top can be thrown into direct communication with said evaporating-receiver by opening a cock in a connecting side pipe. The dome-shaped top of the aforesaid percolator must be supplied with a weighted valve, and should have a plug stopped opening for the reception of the bark or other substance to be extracted, and the menstruum for properly wetting said substance. The said top of the percolator must also be so constructed or situated that it can be suddenly cooled for the purpose of condensing steam within the same.

In the accompanying drawings, K is the percolator. M is the evaporating-receiver. Q is the perforated bottom of the percolator. G is the double-shaped top of the percolator. R is the side pipe which connects the evaporating-receiver M with the top of the percolator. F is a man-hole in the top of the percolator. E is a screw-plug closing an aperture in the top G, through which the substance to be operated upon may be placed within the percolator, and also the menstruum for wetting the same. *s* is a weighted valve closing a conical aperture in the offset *t* in the top G of the percolator. P is a stop-cock through which the contents of the evaporating-receiver may be discharged. N indicates stop-cocks for ascertaining the height of the fluid in said evaporating-receiver. B is a cistern placed some distance above the top of the percolator. O indicates a pipe leading from the cistern B to the receiver. M D is a branch descending from the pipe O and terminating a short distance above the central portion of the top G of the percolator. C is a stop-cock in the pipe O, and *d* is a stop-cock in the branch D of said pipe.

The under side of the top G of the percolator may be supplied with ledges, as shown in Fig. 3, for the purpose of causing the fluid which is condensed thereupon to drip into the central portions of the percolator instead of running down to the periphery of the same, as would be the case if said cover should have a smooth under surface.

A gutter, I, is formed around the periphery of the dome-shaped top of the percolator for the reception of the refrigerating-fluid which may be discharged upon said cover, and which is carried off through the discharging-pipe H.

My method of dissolving, displacing, and concentrating the soluble portions of any suitable vegetable substance is as follows, viz: The vegetable substance, properly disintegrated, is placed within the percolator, and is then saturated with any suitable menstruum. I generally allow the menstruum to pass through the vegetable substance into the receiver M until the said fluid rises therein to one of the stop-cocks N. I then cause the said receiver M to be acted upon by heat and close the stop-cock in the pipe R. I also so adjust the weight on the lever of the valve *s* that there will be but a slight pressure upon said valve. The said adjustment of the valve *s* is allowed to remain until the steam rising from the receiver M, and penetrating every portion of the vegetable matter in the percolator, has displaced the fixed air in said vegetable matter and discharged it through said valve. As soon as the operator discovers that all the fixed air has been discharged from the contents of the percolator, he must then so adjust the weight upon the lever of the valve *s* as to cause a pressure upon it equal to about twenty-five pounds to every square inch of the area of the aperture closed by said valve. The process is then continued until the lifting of the valve *s* indicates that there is a pressure of steam within the percolator upon a corresponding amount of surface equal to that of the external force exerted upon the valve *s*. Then, either by regulating the fire under the receiver M or by letting cold water upon the top G of the percolator, the steam should be kept at about the above-named degree of pressure for a suitable length of time to dissolve the soluble portions of the contents of the per-colator, which I generally find to be about one hour. Then the steam should be admitted directly to the top of the percolator by opening the cock in the pipe R, and at the same time a stream of cold water should be admitted upon the apex of the top G of the percolator. The fluid produced by the condensation of steam on the under surface of the top of the percolator, as it percolates through the substance operated upon, will absorb and carry down its soluble matter into the receiver M. The aqueous portion of the fluid within the receiver M, being continuously separated therefrom in the shape of steam, and carried to the top of the percolator and there condensed, and the fluid of condensation being, as before stated, converted into a vegetable solution during its passage back to the receiver again, it will be perceived that but a comparatively short period of time will be required to extract the whole of the soluble matter contained in the vegetable substance placed within the percolator, and, if desired, in the shape of a saturated solution.

The escape of the air through the valve of the percolator, above referred to, will not be indicated by the organs of vision, but by a sharp whistling sound. When the steam commences to escape through the valve of the percolator, it will be indicated by the organs of both seeing and hearing. After the aforesaid greater degree of pressure is exerted upon the valve *s*, it should be occasionally raised to let out any air that may afterward be displaced and forced into the crown of the percolator. The accumulation of a stratum of air within the crown of the percolator would prevent the steam from coming in contact with its under surface, and thereby greatly retard the condensation of the steam when the refrigerating-fluid is discharged upon the outer surface of said crown.

What I claim as new, and desire to secure by Letters Patent, is—

1. The within-described process of separating the soluble and insoluble parts contained in the bark or other substance to be extracted by first saturating or swelling said substance with the menstruum, and exposing the same in its damp state to the action of steam, substantially in the manner set forth.

2. Washing the bark or other substance, after the same has been acted upon by the steam, with liquid obtained by the condensation of the steam, substantially in the manner herein described.

3. The apparatus composed of a percolator, K, and receiver M, separated from each other by a perforated diaphragm or its equivalent, in combination with a metallic cover supplied with an outwardly-opening valve and with a pipe connecting the top of the percolator with the receiver, substantially as described, so that the contents of said percolator can be operated upon first by steam generated in the receiver and then by the percolation of the menstruum.

ABRAHAM STEERS.

Witnesses:
C. L. TOPLIFF,
I. M. COVINGTON.